US 8,543,350 B2

(12) United States Patent
Hilby (10) Patent No.: US 8,543,350 B2
(45) Date of Patent: Sep. 24, 2013

(54) SYNTHETIC VIBRATION ISOLATION SYSTEM FOR FREEFALL GRAVIMETER

(75) Inventor: Timothy R. Hilby, San Mateo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 175 days.

(21) Appl. No.: 12/860,804

(22) Filed: Aug. 20, 2010

(65) Prior Publication Data
US 2011/0046913 A1 Feb. 24, 2011

Related U.S. Application Data (60) Provisional application No. 61/236,023, filed on Aug. 21, 2009.

(51) Int. Cl.
*G01P 15/18* (2013.01)

(52) U.S. Cl.
USPC ............ 702/141; 73/382; 356/106; 356/112; 356/130; 324/244; 324/76.9

(58) Field of Classification Search
USPC .......................................... 73/152.03, 152.18
See application file for complete search history.

(56) References Cited

U.S. PATENT DOCUMENTS

| 3,159,785 | A | * | 12/1964 | Beynon | ........................ 324/254 |
| 3,688,584 | A | * | 9/1972 | Stone et al. | .................. 73/382 R |
| 3,704,626 | A | * | 12/1972 | Stone | ........................ 73/382 R |
| 3,727,462 | A | * | 4/1973 | Stone et al. | .................. 73/382 R |
| 3,865,467 | A | * | 2/1975 | Von Thuna | .................... 359/529 |
| 4,255,969 | A | | 3/1981 | Lautzenhiser | |
| 4,384,487 | A | * | 5/1983 | Browning | .................... 73/382 G |
| 4,419,891 | A | * | 12/1983 | Browning | .................... 73/382 G |
| 4,625,547 | A | | 12/1986 | Lyle et al. | |
| 5,351,122 | A | | 9/1994 | Niebauer et al. | |
| 5,892,151 | A | * | 4/1999 | Niebauer et al. | ............ 73/382 R |
| 6,082,194 | A | * | 7/2000 | Gladwin | .................... 73/382 G |

(Continued)

FOREIGN PATENT DOCUMENTS

WO     WO 97/41459     11/1997

OTHER PUBLICATIONS

Author: Boyd D. Schimel, Jow-Lian Ding, Michael J. Anderson and Walter J. Grantham Title: ME 349 Dynamic Systems laboratory Manual Publisher: School of Mechanical and Materials Engineering, Washington State University Date: Apr. 1997.*

(Continued)

*Primary Examiner* — Tung S Lau
*Assistant Examiner* — Stephanie Chang
(74) *Attorney, Agent, or Firm* — McDermott Will & Emery LLP (57) ABSTRACT

A gravimeter is disclosed that comprises a base, a reference device coupled to the base and configured to move along a first axis, a falling device configured to free fall from a first position to a second position on a second axis that is parallel to the first axis, a measurement module coupled to the reference device and configured to provide a first signal of the displacement of the reference device relative to the base and provide a second signal of the displacement of the falling device relative to the reference device. A processing unit accepts the first and second signals and computes a displacement of the falling device in inertial space by processing the first and second signals and subtracting the processed first signal from the processed second signal.

19 Claims, 8 Drawing Sheets

(56) References Cited

U.S. PATENT DOCUMENTS

| | | | |
|---|---|---|---|
| 6,947,621 B2* | 9/2005 | Bell et al. | 385/15 |
| 7,003,186 B2* | 2/2006 | Bell et al. | 385/15 |
| 7,254,290 B1* | 8/2007 | Somerstein et al. | 385/14 |
| 7,469,585 B2* | 12/2008 | Meyer | 73/382 R |
| 7,729,829 B2* | 6/2010 | Messih et al. | 701/37 |
| 7,856,866 B2* | 12/2010 | Dick et al. | 73/105 |
| 2007/0067080 A1* | 3/2007 | Messih et al. | 701/37 |
| 2008/0046185 A1 | 2/2008 | Niebauer et al. | |
| 2008/0110258 A1* | 5/2008 | Meyer | 73/382 R |
| 2009/0064771 A1* | 3/2009 | Dick et al. | 73/105 |
| 2009/0263142 A1* | 10/2009 | Shen et al. | 398/158 |
| 2009/0275031 A1* | 11/2009 | Tanner et al. | 435/6 |
| 2010/0277164 A1* | 11/2010 | Tilbrook et al. | 324/244 |
| 2012/0242848 A1* | 9/2012 | Hirayama | 348/208.6 |

OTHER PUBLICATIONS

Rinker, Robert Lee III, "Super Spring: A New Type of Low-Frequency Vibration Isolator" Thesis/Dissertation, Listing from Chinook University Libraries Catalog, University of Colorado at Boulder, 1983.

Carter, et al., "The New FG5 Absolute Gravimeter" 1995, pp. 1-6.

Faller, James E., "The Measurement of Little g: A Fertile Ground for Precision Measurement Science", Journal of Research of the National Institute of Standards and Technology, Nov.-Dec. 2005, pp. 559-581, vol. 110, No. 6.

Van Camp, "The FG5 Absolute Gravimeter: Metrology and Geophysics" Royal Observatory of Belgium, Seismology and Swiss Federal Office of Metrology and Accreditation, METAS, 2003.

Shagam et al., "Optical Frequency Shifter for Heterodyne Interferometers Using Multiple Rotating Polarization Retarders", Applied Optics, Oct. 1, 1978 vol. 17, p. 3034, http://www.optics.arizona.edu/jcwyant/pdf/Published_Papers/Phase_Shifting/Frequency%20Shifter.pdf.

Parasuram, "Handout-E13-Examples on Transfer Functions, Poles and Zeros", Aug. 22, 2001, http://www1.mengr.tamu.edu/aparlos/MEEN651/E13.pdf.

* cited by examiner

SYNTHETIC VIBRATION ISOLATION SYSTEM FOR FREEFALL GRAVIMETER

CROSS-REFERENCE TO RELATED APPLICATIONS

This application claims the benefit of priority under 35 U.S.C. §119 from U.S. Provisional Patent Application Ser. No. 61/236,023 entitled "SYNTHETIC VIBRATION ISOLATION SYSTEM FOR FREEFALL INTERFEROMETRIC GRAVIMETER," filed Aug. 21, 2009, which is incorporated by reference in its entirety for all purposes.

STATEMENT REGARDING FEDERALLY SPONSORED RESEARCH OR DEVELOPMENT

Not applicable.

BACKGROUND

1. Field

The present disclosure generally relates to systems and methods of measuring of acceleration due to gravity and, more particularly, gravimeters using signal processing to provide synthetic vibration isolation.

2. Description of the Related Art

Gravimetry is a branch of science concerned with measurement of gravitational fields. Precision measurement of the earth's gravitational field is important both for fundamental scientific research and for the exploration of oil and mineral resources. Gravity is usually measured in units of acceleration. One commonly used unit of acceleration is the "g", where 1 g is the standard value of earth's gravitational acceleration at sea level and, more precisely, has a value of 9.80665 meters per second squared (9.80665 m/s$^2$) as declared at the 3rd Conférence Générale des Poids et Mesures (CGPM) in 1901. The derived unit of a "micro-g", i.e. a millionth of a g or 9.80665 μm/s$^2$, is sometimes used when dealing with small variations in gravity. Another unit of acceleration used extensively in the science of gravimetry is the "gal", named in honor of the Italian physicist Galileo Galilei. The gal is defined as 1 centimeter per second squared (1 cm/s$^2$).

Precision measurements of gravity are also used to map the shape of the earth, which is the science of geodesy, as the value of the acceleration due to gravity changes with distance from the center of the earth. Post-glacial rebound, the viscoelastic response of the Earth to the melting of the large ice sheets of the ice ages, currently is expressed in vertical crustal motions on the order of one millimeter per year over the entire Earth. The crustal rebound exceeds 1 centimeter per year in regions of North America and Europe, where the major ice sheets existed 20,000 years ago. The change in gravity caused by a change in the distance of a point on the surface of the Earth from the center of the mass is approximately 3 microgal per centimeter. The ability to measure a change in gravity of 1 microgal therefore corresponds to a resolution of 3 millimeters in vertical crustal motion, assuming that other causes of changes in gravity can be properly accounted for. As the gravitational acceleration on the Earth's surface is on the order of 980 gal, measuring gravity to an accuracy of 1 microgal requires a resolution of approximately 1 part per billion ($10^{-9}$).

People have been building instruments to measure the acceleration due to gravity, called gravimeters, since 1680. The methods of measuring the acceleration due to gravity have evolved from pendulums that could measure gravity to 1 part in 10,000 ($10^{-4}$) to today's instruments that drop an object in a vacuum and measure its position as it free falls over time. Some instruments drop a mass having a retroreflector, an optical device that reflects any incident beam of light directly back at the source, and repeatedly measure the displacement of the mass as it falls using optical interferometry. An ideal curve is then fit to these displacement measurements to calculate the acceleration of the falling mass. This process of dropping a mass may be repeated hundreds of times and the results combined to further reduce the uncertainty of the composite value of the acceleration.

Conventional free-fall gravimeters observe a mass free-falling for a distance on the order of tens of centimeters in a vacuum chamber. The position of the falling mass is typically measured using interferometric techniques, bouncing a laser beam off a retroreflector on the falling mass and off a reference retroreflector that is mounted on an active vibration isolation system that has a period of approximately 60 seconds. While the accuracy of a conventional free-fall gravimeter is on the order of $10^{-9}$, gravimeters of this type may weigh up to 350 kg and have a height of up to 1.5 meters tall. Much of this weight and size is attributable to the complexity of providing a reference retroreflector that approximates a stationary reference in inertial space. This size and weight present limits to the usability of conventional gravimeters.

SUMMARY

The disclosed gravimeter provides high resolution measurements of the acceleration of a falling mass with a much smaller device than previously available. Such a device enables the precision measurement of the local gravity field in applications not previously possible, such as down-hole measurements in oil wells.

In certain embodiments, a gravimeter is disclosed that comprises a base, a reference device coupled to the base wherein the reference device is configured to move along a first axis, a falling device configured to free fall from a first position on a second axis that is parallel to the first axis to a second position on the second axis, a measurement module coupled to the reference device wherein the measurement module is configured to provide a first signal comprising a displacement of the reference device relative to the base and provide a second signal comprising a displacement of the falling device relative to the reference device, and a processing unit configured to accept the first and second signals and compute a displacement of the falling device in an inertial space by processing the first and second signals and subtracting a processed first signal from the processed second signal.

In certain embodiments, a method of measuring the relative position of a falling mass in inertial space is disclosed, the method comprising the steps of measuring a first displacement of a reference device relative to a base during an increment of time, measuring a second displacement of a free-falling mass relative to the reference device during the same increment of time, filtering the first displacement, subtracting the filtered first displacement from the second displacement, computing the relative displacement of the falling mass in inertial space and storing the relative displacement and time increment, repeating the steps of measuring an increment of time, measuring the first and second displacements, filtering the first displacement, subtracting the filtered first displacement from the second displacement, and computing the relative displacement and storing the relative displacements and time increments related to a single drop of the mass, calculating a best-fit estimate of the acceleration of the free-falling mass from the stored relative displacements and time increments made during the single drop, repeating the drop and repeating the steps of measuring the first and second displacements, filtering the first displacement, subtracting the filtered first displacement from the second displacement, and computing the relative displacement and storing the relative displacements and time increments, and calculating a best-fit estimate of the acceleration for each drop, and calculating an overall acceleration of the mass by averaging the best-fit estimates of the acceleration from all the drops.

In certain embodiments, a computer-readable medium having computer-executable instructions stored thereon for execution by a processor to perform a method of measuring the relative position of a falling mass in inertial space, the method comprising the steps of measuring a first displacement of a reference device relative to a base during an increment of time, measuring a second displacement of a free-falling mass relative to the reference device during the same increment of time, filtering the first displacement, subtracting the filtered first displacement from the second displacement, computing the relative displacement of the falling mass in inertial space and storing the relative displacement and time increment, repeating the steps of measuring an increment of time, measuring the first and second displacements, filtering the first displacement, subtracting the filtered first displacement from the second displacement, and computing the relative displacement and storing the relative displacements and time increments related to a single drop of the mass, calculating a best-fit estimate of the acceleration of the free-falling mass from the stored relative displacements and time increments made during the single drop, repeating the drop and repeating the steps of measuring the first and second displacements, filtering the first displacement, subtracting the filtered first displacement from the second displacement, and computing the relative displacement and storing the relative displacements and time increments, and calculating a best-fit estimate of the acceleration for each drop, and calculating an overall acceleration of the mass by averaging the best-fit estimates of the acceleration from all the drops.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Figure 1:
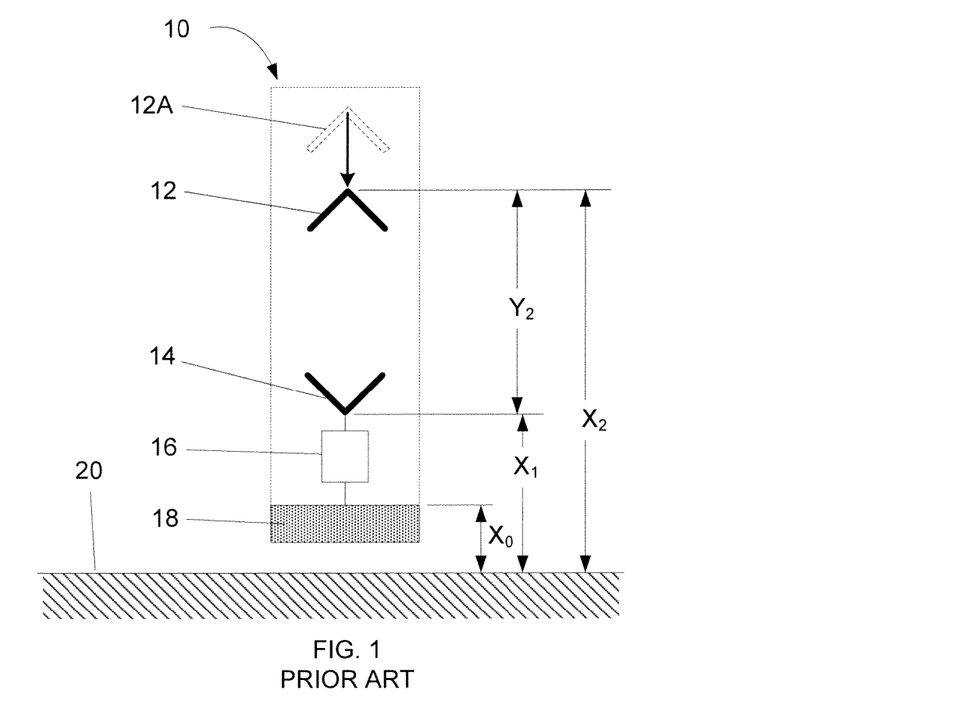
FIG. 1 depicts a schematic concept of a conventional gravimeter.

FIG. 1 depicts a schematic concept of a conventional gravimeter 10. The gravimeter comprises a base 18, which can be considered as the case or structure of the instrument, a reference retroreflector 14 that is coupled to the base 18 through a compliant element 16, and a falling retroreflector 12. The inertial reference plane 20 represents a fixed reference in inertial space. The base 18, reference retroreflector 14, and falling retroreflector are located at distances $X_0$, $X_1$, and $X_2$, respectively, from inertial reference plane 20. In the ideal, the reference reflector 14 is stationary in inertial space. In reality, base 18 moves in inertial space due to ground motion and vibration, thermal expansion, and other environmental disturbances.

In use, the falling retroreflector 12 starts from a position 12A, shown as a broken line outline, and free falls toward the reference retroreflector 14. While falling, the instantaneous position of the falling retroreflector 12 relative to the reference retroreflector 14 is labeled $Y_2$ in FIG. 1. Similarly, the instantaneous position of the falling retroreflector 12 relative to the inertial reference plane 20 is labeled $X_2$ in FIG. 1. While the falling retroreflector 12 is in free fall, a sequence of measurements is taken of the sequential displacements of the falling retroreflector relative to reference retroreflector 14. If an ideal equation of the motion of a body falling solely under the influence of gravity is fit to the measured displacements, a value of the acceleration due to gravity can be calculated. If the reference reflector 14 were truly fixed in inertial space, the displacement of $Y_2$ would be equivalent to the displacement of $X_2$ in inertial space and the accuracy of this measurement would be limited only by the accuracy of the displacement measurement instruments. The motion of the reference reflector 14 caused by motion of the base 18 being transmitted through the compliant member 16, however, adds error to the measurement of the displacement of $Y_2$. One approach to reducing this error is to make the compliant element as soft as possible.

Figure 2:
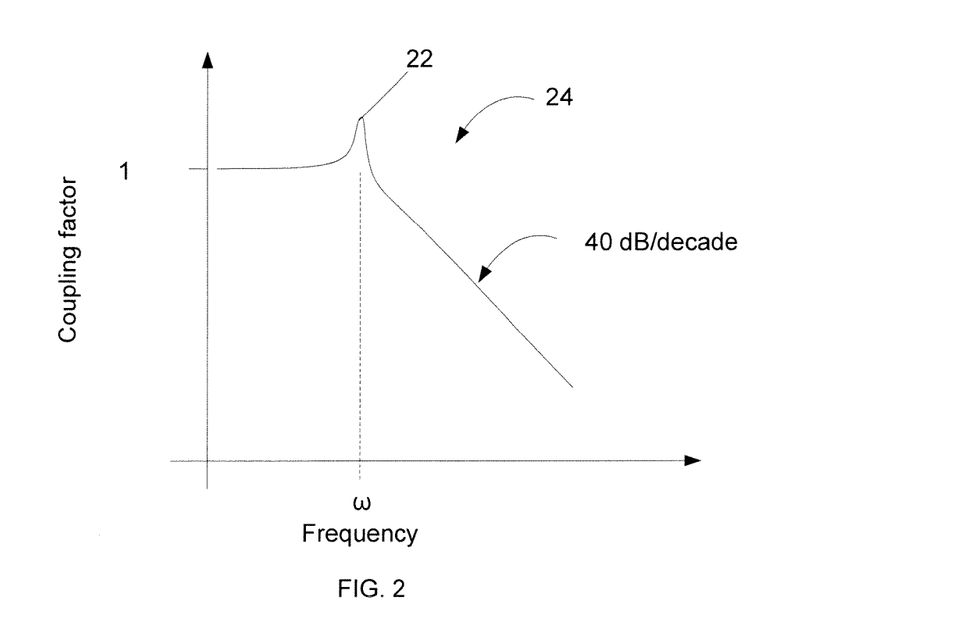
FIG. 2 depicts a transfer function of a spring-mass system.

FIG. 2 depicts a transfer function 24 of a spring-mass system such as formed by the reference retroreflector 14 and the compliant element 16. The system will have a natural frequency $\omega = \sqrt{k/m}$ where m is the mass of the suspended element, the reference retroreflector in the example of FIG. 1, and k is the spring rate of the compliant element 16. While most elastic systems are not truly linear over their entire range of motion, most systems can be approximated by a linear spring rate for a limited region of operation, which is what we will do here. The natural frequency 22 is indicated on the horizontal axis by the label $\omega$. At frequencies below the natural frequency 22, the response is approximately unity, which indicates that a disturbance in the base 18 at these frequencies will pass without reduction to the reference reflector 14. At frequencies above the natural frequency 22, the response rolls off at 40 dB/decade, i.e. decreases such that a doubling of the frequency will halve the response. This is commonly referred to as a "low-pass" filter, as low frequency disturbances pass through while high frequency disturbances are attenuated.

Returning to FIG. 1, the natural frequency of the spring-mass system formed by the reference retroreflector 14 and the compliant element 16 can be reduced by increasing the mass of the reference retroreflector 14 or reducing the spring rate of the compliant element 16, or both. Some gravimeters add an active control of the attachment point of the compliant element 16 to the base 18 that emulates the behavior of a spring of up to a kilometer in length, such that the most accurate gravimeters have suspension systems with natural frequencies of a few tenths of a hertz. This performance comes at a cost, however, and the gravimeters are large and heavy, up to 350 kg and 1.5 meters tall.

Figure 3:
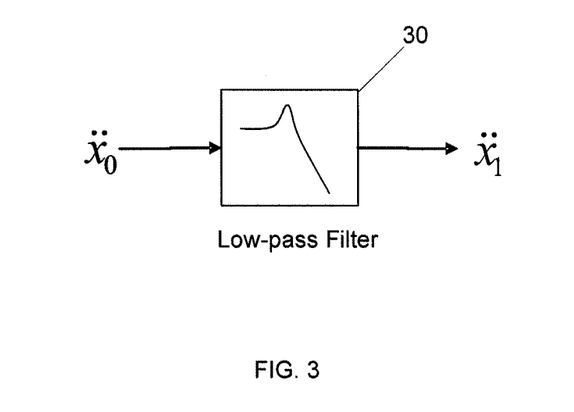
FIGS. 3 and 4 illustrate the concepts of how a low-pass filter may be replicated using a high-pass filter according to certain aspects of the present disclosure.
Figure 4:
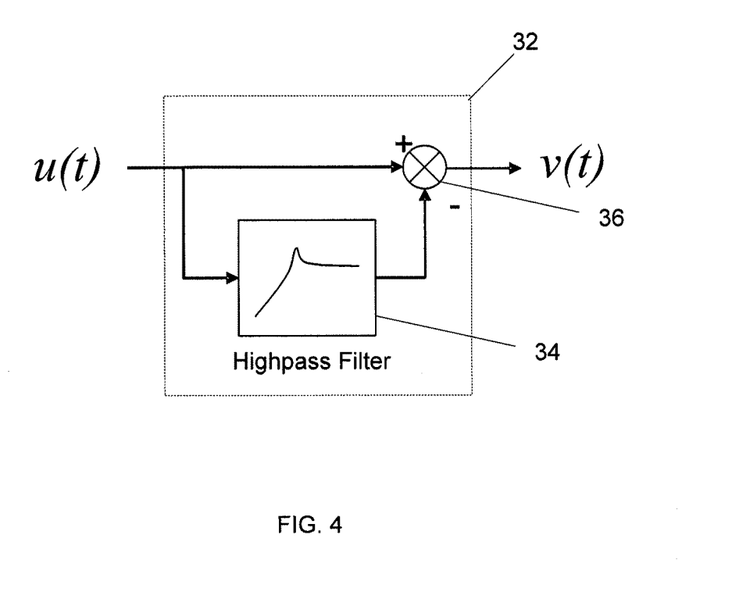

FIGS. 3 and 4 illustrate the concepts of how a low-pass filter may be replicated using a high-pass filter according to certain aspects of the present disclosure. In FIG. 3, the transfer function of the system of FIG. 1 is depicted where the disturbance acceleration of the base 18, whose position is $X_0$, is physically filtered in block 30 by the low-pass mass-spring system of reference retroreflector 14 and compliant element 16 to produce the acceleration of the reference retroreflector 14. This is shown in FIG. 3 with an input of the acceleration of the base 18, where $X_0$ is the position of the base 18 with respect to the inertial reference 20 and the double-dot notation $\ddot{X}_0$ indicates that this is the second derivative which is acceleration. Similarly, double-dot notation $\ddot{X}_1$, indicates the output, which is the acceleration of the reference retroreflector 14 whose position is $X_1$.

FIG. 4 depicts a computational system that produces a synthetic vibration isolation element 32 using a computed high-pass filter 34. When the portion of a signal u(t) that remains after passing through the high-pass filter 34 is subtracted from the initial signal in the summation node 36, the remaining signal v(t) is only the low-frequency components of the signal, similar to the filtering accomplished by the low-pass filter 30 of FIG. 3.

Figure 5:
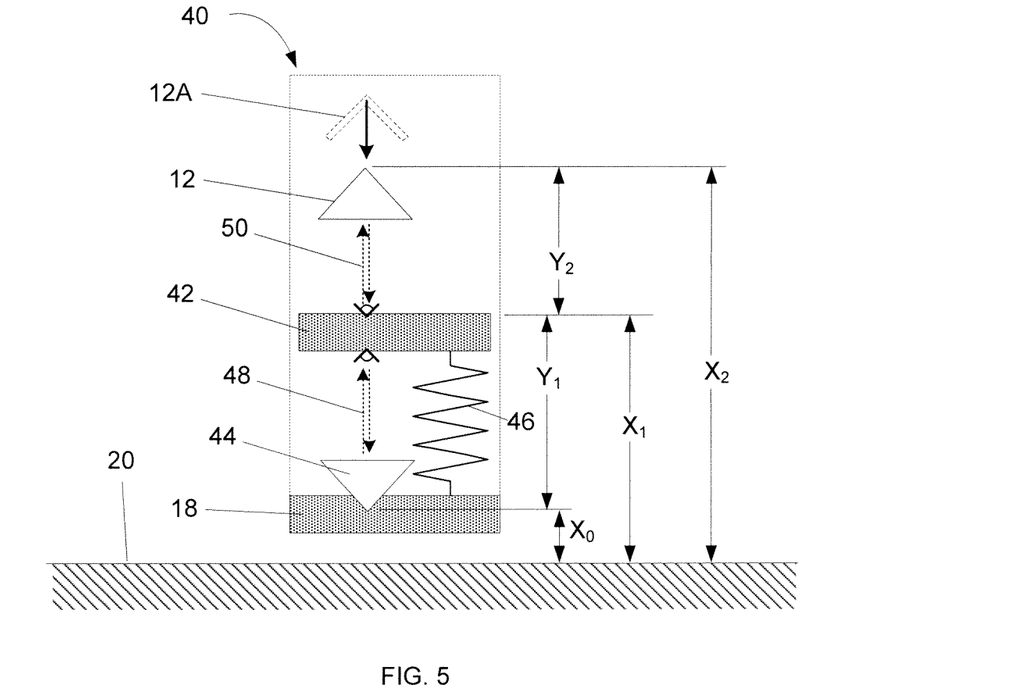
FIG. 5 depicts a schematic of a gravimeter configured to use synthetic vibration isolation according to certain aspects of the present disclosure.

FIG. 5 depicts a schematic of a gravimeter 40 configured to use synthetic vibration isolation according to certain aspects of the present disclosure. The inertial reference 20, the base 18, and the falling retroreflector 12 are the same as presented in FIG. 1. In this case, however, the reference retroreflector 44 is fixedly coupled to the base 18. A measurement device (not shown) is coupled to the reference device 42 that is coupled through compliant element 46 to the base 18. The measurement device measures the displacement relative to the reference device 42 of the falling retroreflector 12 along optical path 50 and from the reference device 42 to the reference retroreflector 44 along optical path 48. The relative positions of the base 18, reference device 42, and falling retroreflector 12 in inertial space are given by variables $X_0$, $X_1$, and $X_2$.

The following equations describe the basic dynamics of the gravimeter of FIG. 5. The subscripts of variables such as mass are consistent with the subscripts of the position variables shown in FIG. 5. In equation (1), the motion of the falling retroreflector 12 is governed solely by gravity g, wherein $m_2$ is the mass of the falling retroreflector 12 and $x_2$ and $\ddot{x}_2$ are the position and acceleration, respectively, of the falling retroreflector 12 as shown in FIG. 5.

$$m_2 \ddot{x}_2 = -m_2 \cdot g \tag{1}$$

The motion of the reference device 42 is governed both by gravity g and the forces applied by the compliant element 46 as shown in equation (2), wherein $k_1$ is the spring rate of compliant element 46, $m_1$ is the mass and $x_1$ and $\ddot{x}_2$ are the position and acceleration, respectively, of the reference device 42, and $x_0$ is the position of the base 12 and the coupled reference retroreflector 44 as shown in FIG. 5.

$$m_1 \ddot{x}_1 = -m_1 \cdot g - k_1(x_1 - x_0) \tag{2}$$

If the static displacement due to gravity $$\frac{m_1 \cdot g}{k_1}$$

is ignored and only the motion of the reference device 42 about its static position is considered, as indicated by equation (3)

$$x_1 \Leftarrow x_1 + \frac{m_1 \cdot g}{k_1} \tag{3}$$

then equation (2) becomes $$m_1 \ddot{x}_1 = k_1(x_1 - x_0) \tag{4}$$

Now we can state the equations relating $Y_1$ and $Y_2$ to $X_0$, $X_1$, and $X_2$:

$$y_2 = x_2 - x_1 \tag{5}$$

$$y_1 = x_1 - x_0 \tag{6}$$

The natural frequency $\omega_1$ of the spring-mass system of the reference device 42 and the compliant element 46 is defined as $$\omega_1^2 \equiv \frac{k_1}{m_1} \tag{7}$$

The equations of motion (1) and (4) may now be simplified to $$\ddot{x}_2 = -g \tag{8}$$

$$\ddot{x}_1 = \omega_1^2 \cdot (x_1 - x_0) \tag{9}$$

Equation (9) can then be rearranged into $$\ddot{x}_1 + \omega_1^2 \cdot x_1 = \omega_1^2 \cdot x_0 \tag{10}$$

At this point, the equations (11) and (8) can be converted to Laplace transforms and rearranged into $$X_1(s) \cdot \left( \frac{s^2 + \omega_1^2}{\omega_1^2} \right) = X_0(s) \tag{11}$$

$$X_2(s) = -\frac{g}{s^2} \tag{12}$$

wherein the notation $X_1(s)$, for example, indicates that this is a Laplace transform of the real parameter $X_1(t)$ where t indicates that this is a function of time. Similarly converting the equations (5) and (6) of the $Y_1$ and $Y_2$ measurements into Laplace transforms $$Y_1(s) = X_1(s) - X_0(s) \tag{13}$$

$$Y_2(s) = X_2(s) - X_1(s) \tag{14}$$

Filtering the $Y_1(s)$ measurement with a linear filter G(s) and subtracting the filtered results from $Y_2(s)$ produces the equation $$Y_2(s) - Y_1(s) \cdot G(s) = -\frac{g}{s^2} - X_1(s) + X_1(s) \cdot \frac{s^2}{\omega_1^2} \cdot G(s) \quad (15)$$

which can be rearranged into $$Y_2(s) - Y_1(s) \cdot G(s) = -\frac{g}{s^2} - \left(1 - \frac{s^2}{\omega_1^2} \cdot G(s)\right) \cdot X_1(s) \quad (16)$$

Substituting equation (11) into equation (16) produces:

$$Y_2(s) - Y_1(s) \cdot G(s) = -\frac{g}{s^2} - \left(1 - \frac{s^2}{\omega_1^2} \cdot G(s)\right) \cdot \left(\frac{\omega_1^2}{s^2 + \omega_1^2}\right) \cdot X_0(s) \quad (17)$$

From equation (17), it can be seen that the motion $X_0$ of the base 18 is filtered by the spring-mass system of the reference device 42 and compliant element 46 in the right parenthetical term and then filtered by the linear filter G(s) in the left parenthetical term.

If G(s) is chosen to implement a low-pass filter, which in effect provides a high-pass of the disturbance following the concept of FIG. 4, then one example form of G(s) is:

$$G(s) \equiv \omega_1^2 \cdot \left(\frac{1}{s^2 + 2 \cdot \xi_h \cdot \omega_h + \omega_h^2}\right) \quad (18)$$

where $\omega_1$ is a natural frequency, and $\omega_h$ is a filter natural frequency. According to one example, the filter natural frequency is less than the natural frequency. According to one example, the natural frequency is greater than 10 Hz. According to one example, the filter natural frequency is less than 0.5 Hz.

In other embodiments, other forms of G(s) are used to produce other linear and nonlinear filter functions. Substituting equation (18) into equation (17) produces $$Y_2(s) - Y_1(s) \cdot G(s) = \quad (19)$$
$$-\frac{g}{s^2} - \left(\frac{2 \cdot \xi_h \cdot \omega_h \cdot s + \omega_h^2}{s^2 + 2 \cdot \xi_h \cdot \omega_h \cdot s + \omega_h^2}\right) \cdot \left(\frac{\omega_1^2}{s^2 + \omega_1^2}\right) \cdot X_0(s)$$

If the value of the damping coefficient $\xi_h$ is chosen to be much less than 1, e.g. a lightly damped system, then equation (19) becomes:

$$Y_2(s) - Y_1(s) \cdot G(s) \approx -\frac{g}{s^2} - \left(\frac{\omega_h^2}{s^2 + \omega_h^2}\right) \cdot \left(\frac{\omega_1^2}{s^2 + \omega_1^2}\right) \cdot X_0(s) \quad (20)$$

It can be seen from equation (20) that the disturbance $X_0$ will be rejected by a cascade of the spring-mass isolation system formed by reference device 42 and compliant element 46 and an initial 40 dB/decade rejection of the low-pass filter.

It should be noted that while the above discussion of filtering and processing of the $Y_1$ and $Y_2$ measurements is conducted in the frequency domain, as embodied in the Laplace transforms, the implementation of the signal processing and filtering may be equally accomplished in the time domain as continuous or discrete processes. When implemented in a system comprising digital computers, a discrete time domain structure may be most convenient. In analog optical or electrical systems, a continuous time domain structure may be most convenient. It will be apparent to those of ordinary skill in the art to implement the disclosed methodology using any of the known time domain and frequency domain signal processing methodologies without departing from the scope of the claims.

Figure 6:
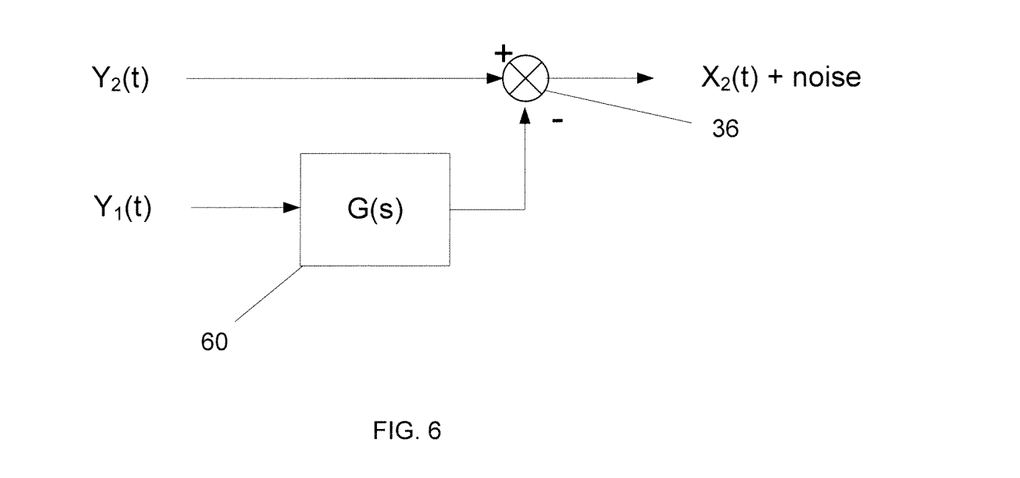
FIG. 6 depicts a concept of how the gravimeter synthetic vibration isolation system is implemented according to certain aspects of the present disclosure.

FIG. 6 depicts a concept of how the gravimeter synthetic vibration isolation system is implemented according to certain aspects of the present disclosure. The real-time measurements of $Y_1$ signal passes through the filter 60 and is subtracted from the real-time measurement of $Y_2$ to produce a corrected measurement of the inertial displacement $X_2$ of the falling retroreflector 12. To avoid introducing errors through aliasing at the resonant frequency of filter 60, gravity estimates should be averaged over a period corresponding to an integer multiple of the inverse filter resonant frequency as shown in equation (21).

$$T_{ave} = \frac{m}{f_h} = \frac{2 \cdot \pi \cdot m}{\omega_h} \quad (21)$$

Figure 7:
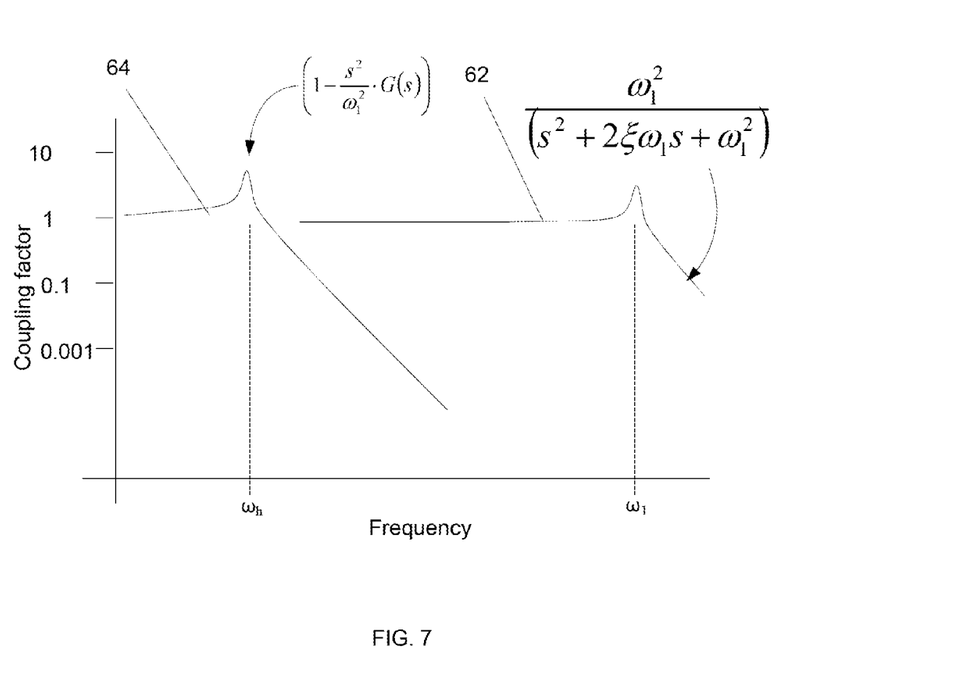
FIG. 7 illustrates the frequency response of the physical filtering and the synthetic vibration isolation system according to certain aspects of the present disclosure.

FIG. 7 illustrates the frequency response of the physical filtering and the synthetic vibration isolation system according to certain aspects of the present disclosure. Curve 62 represents the physical filtering of the spring-mass isolation system formed by reference device 42 and compliant element 46. As shown in FIG. 7, curve 62 may be represented by $$\frac{\omega_1^2}{(s^2 + 2\xi\omega_1 s + \omega_1^2)},$$

where $\omega_1$ may represent a natural frequency and $\xi$ may represent a damping coefficient. Curve 64 represents the filtering of the synthetic vibration computation comprising the G(s) filter 60. To reduce the size of a gravimeter, the physical resonant frequency $\omega_1$ can be made relatively high, relying on the filter 60 to remove the lower frequency noise from the computed value of $X_2$.

Figure 8:
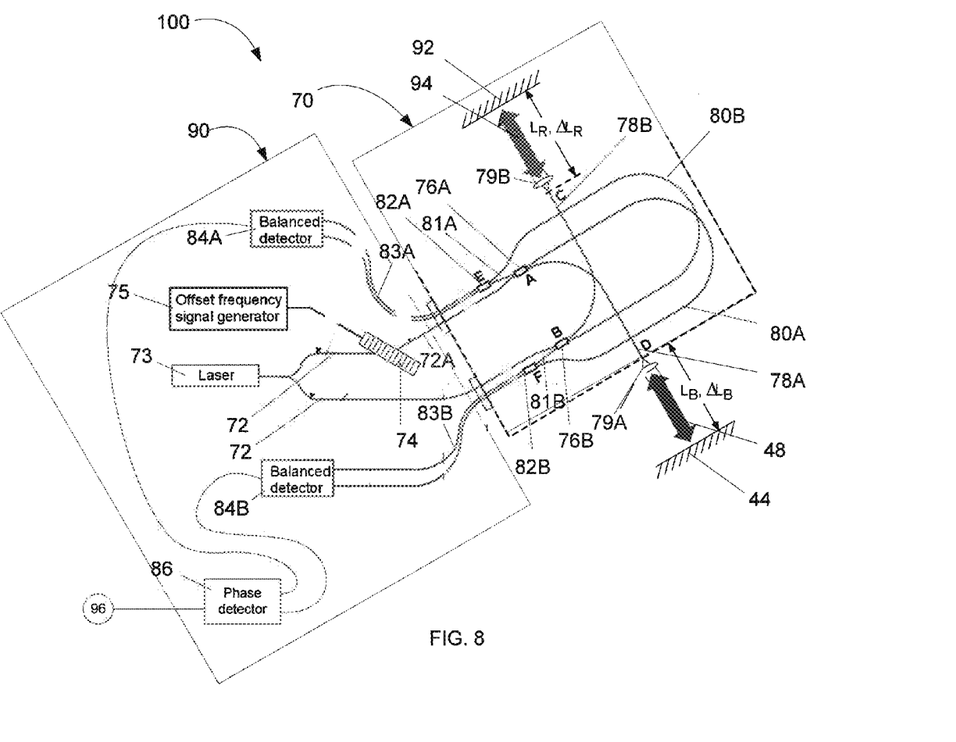
FIG. 8 depicts a schematic concept of an optical measurement module according to certain aspects of the present disclosure.

FIG. 8 depicts a schematic concept of a measurement module 100 according to certain aspects of the present disclosure. The measurement module 100 comprises an optics module 70 and a detector module 90 wherein the optics module 70 is, in this example, mounted on the reference device 42 of FIG. 5. The falling retroreflector 12 and reference retroreflector 44 are repeated in FIG. 8 from FIG. 5, as are the measurement beams 48 and 50. Interferometric displacement measurement systems of this type are disclosed in U.S. Pat. Nos. 6,947,621, 7,003,186, and 7,254,290 which are incorporated herein in their entirety.

The detector module 90 comprises a laser 73 that produces a beam of laser light at a first frequency. This light is carried, in this example, by polarization-maintaining single mode fiber optic cables 72. One of the cables connects to an acousto-optic frequency shifter 74 that is coupled to an offset frequency signal generator 75. The optical frequency shifter 74 changes the frequency of the laser light such that the frequency of the light in the output cable 72A is different from that of the light carried by cable 72. The frequency shift is chosen to create a beat frequency between the frequencies of the light in the cables 72 and 72A. In this example, the cables 72 and 72A pass from the detector module 90 to the optics module 70. In other embodiments, the beam of laser light passes from the detector module 90 to the optics module 70 before the frequency shift and the optical frequency shifter 74 is a part of the optics module 70.

Once inside the optics module 70, cable 72 feeds the laser light into coupler 76B while cable 72A feeds into coupler 76A. Coupler 76A splits the beam into two approximately equal beams and feeds them into output cable 78A and lightwave circuit 80A. Similarly, coupler 76B feeds the light from cable 72 into output cable 78B and lightwave circuit 80B. Output cable 78A feeds the light into a collimating lens 79A which creates measurement beam 48 that travels to reference retroreflector 44 and returns through lens 79A into output cable 78A. When this reflected measurement light reaches couple 76A, it is guided into coupler cable 81A and into coupler 82A. At the same time, the light passing through lightwave circuit 80B also is carried to coupler 82A. In coupler 82A, the light that sent out on measurement beam 48 is combined with the light from lightwave 80B and transferred into a single mode optical cable 83A and carried to detector 84A.

In a parallel set of devices, the light in output cable 78B passes through lens 79B to become measurement beam 94 which bounces off of a fixed retroreflector 92 within the optics module 70 and returns into output cable 78B, is guided by coupler 76B into coupler cable 81B. At the same time, light from lightwave circuit 80A arrives at coupler 82B. In coupler 82B, the light that sent out on reference beam 94 is combined with the light from lightwave 80A and transferred into a single mode optical cable 83B and carried to detector 84B.

The balanced detectors 84A and 84B convert the optical signals into electrical signals that are passed to phase detector 86 that samples and combines the signals from balanced detectors 84A and 84B to determine the displacement of the reference retroreflector 44. The output 96 of the phase detector 86, in this example, is a signal that comprises information about the displacement of reference retroreflector 44. A duplicate of system 100 (not shown), configured to direct beam 48 to falling retroreflector 12 instead of reference retroreflector 44, provides a signal that comprises information about the displacement of falling retroreflector 12.

Figure 9:
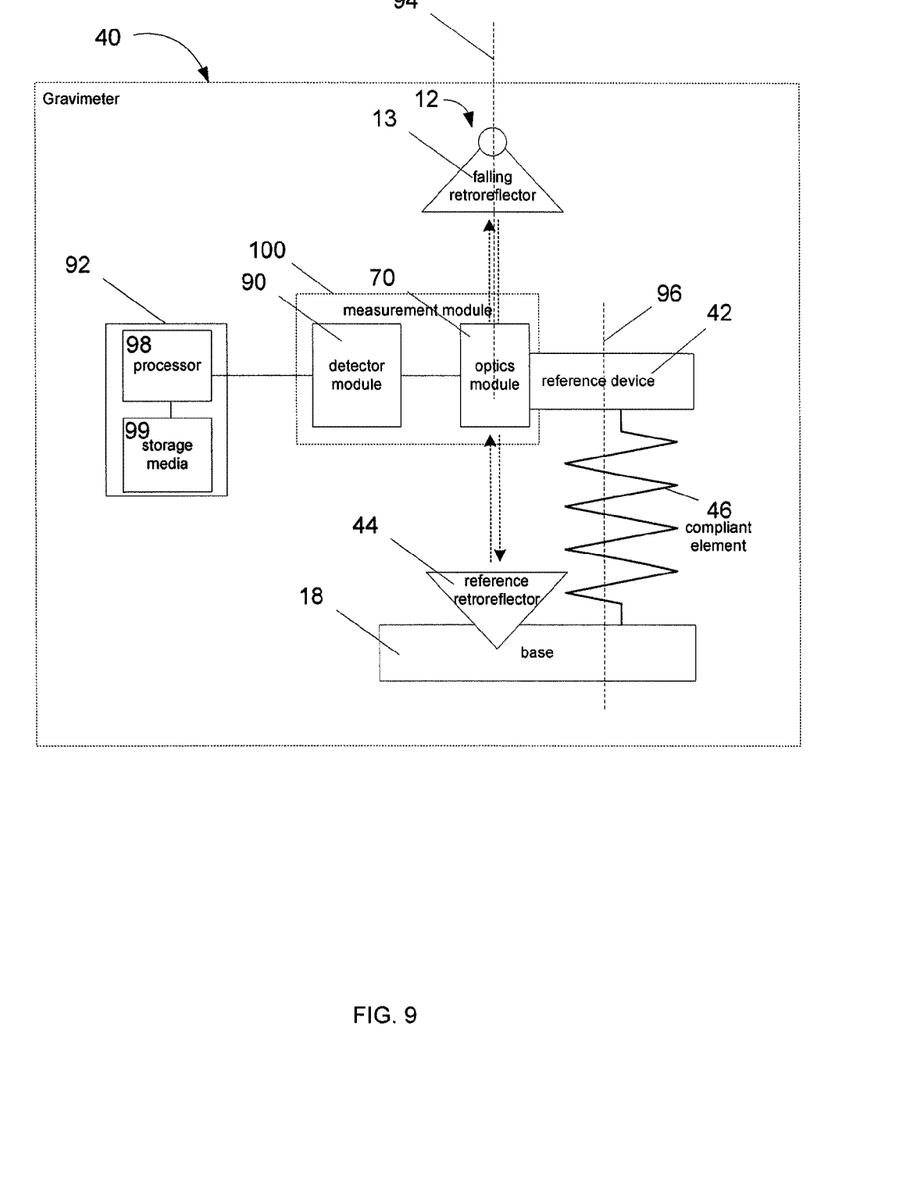
FIG. 9 is a block diagram of a gravimeter according to certain aspects of the present disclosure.

FIG. 9 is a block diagram of a gravimeter 40 according to certain aspects of the present disclosure. The gravimeter 40 comprises a base 18 to which is coupled a reflective fiducial 44, in this example a corner cube retroreflector. A reference device 42 is coupled to the base 12 through a compliant element 46, in this example a spring. The reference device 42 is configured to move along axis 96. A measurement module 100, comprising an optics module 70 and a detector module 90, is coupled to the reference device 42. The optics module 70 is coupled to the reference device 42. In the example configuration of FIG. 9, the detector module 90 is coupled to the optics module but not to the reference device 42. In other embodiments, the detector module 90 is coupled to the reference device 42. A processing unit 92 is coupled to the detector module 90 of the measurement module 100. The processing unit 92 comprises storage media 99 in which are stored the executable instructions to operate the gravimeter 40 and perform the method of computing the acceleration of the falling mass. Storage media 99 may be any computer-readable medium, including Random Access Memory (RAM), Read Only Memory (ROM), Programmable ROM (PROM), Erasable PROM (EPROM), rotating magnetic hard disks, solid-state memory (SSD), flash memory data storage devices including "thumb drives" and flash cards such as Secure Digital (SD) cards and Memory Sticks, optical disks including Compact Disks (CDs) and Digital Video Disks (DVDs), magnetic stripes, removable magnetic media such as Zip and Jaz drives, magnetic tape, magnetically or optically scannable images including Magnetic Ink Character Recognition (MICR) characters, barcodes and two-dimensional matrix codes, or any other suitable storage device. The processing unit 92 also comprises a processor 98 that is coupled to the storage media 99 and the detector module 90, the processor 98 configured to retrieve the executable instructions from the storage media 99 and accept signals from the detector module 90. Processor 98 may be a single processor or a set of one or more processors, and may be part of a computer system such as a standard personal computer (PC), a laptop or other portable computer, a workstation, or a central computer accessed from a remote terminal. A falling device 12 comprising a reflective fiducial 13, in this example a corner cube retroreflector, is configured to move along axis 94 that is parallel to axis 96. In certain embodiments, axis 94 is nominally coincident with axis 96.

Figure 10:
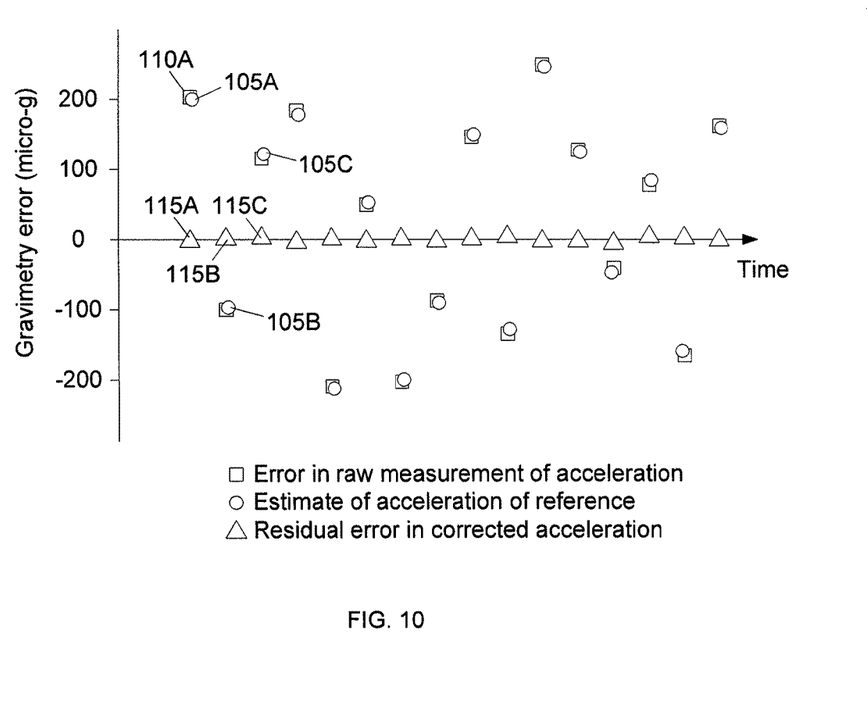
FIG. 10 is a representation of results of a simulation that compared the error in the raw measurement of acceleration to the residual error in the corrected acceleration according to certain aspects of the present disclosure.

FIG. 10 is a representation of results from a simulation that compared the error in the raw measurement of acceleration to the residual error in the corrected acceleration according to certain aspects of the present disclosure. The values presented on this plot are representations of the output of the simulation and should not be interpreted as actual results. The simulation generated a white noise acceleration signal of approximately 5.6 micro-g/sqrt(Hz) and 126 micro-g root-mean-square (RMS) that was used as the motion of the base 18 of the gravimeter 40 of FIG. 5. This input resulted in the reference device 42 moving over a distance of several hundred nanometers, with most of the motion occurring at the natural frequency of the spring-mass system formed by the reference retroreflector 14 and the compliant element 16. The plot of FIG. 10 shows how repeated measurements were generated of the displacements $Y_1$ and $Y_2$ during repeated drops of the falling retroreflector 12, exactly as the gravimeter would be used, that included the noise in the position of the reference device 42. These measurements were converted into a raw estimate of the gravitational acceleration of the falling retroreflector without correction, e.g. treating the $Y_2$ measurement as an $X_2$ measurement. After subtracting the true acceleration, the errors of these estimates are plotted as points 105, where point 105A is the first drop, point 105B is the second drop, 105C is the third drop, and so on. It can be seen that the error in the individual measurements ranges up to 200 milligal or more in both the positive and negative directions. Table 1 shows that the standard error of the uncompensated results of this simulation were 89899 microgal (~90 milligal) and the mean error of approximately 5000 simulated drops is 503 microgal. This is almost three orders of magnitude larger than the microgal-class performance required for geodesy applications.

The simulation also implemented the synthetic vibration isolation filtering disclosed herein and estimated the error in each of the measurements by processing the $Y_1$ signal through the filter G(s). This is converted to an estimate of the acceleration of the reference device 42 and plotted as points 110, where again 110A is the first drop and so on. The residual error, e.g. the difference between each pair of data points 105 and 110, is plotted as data points 115, where again 115A is the difference between 105A and 110A, and so on. It can be seen that the estimates 110 of the acceleration of the reference device 42 are very close to the errors in the measurements 105 and that the residual errors 115 are much smaller than the raw errors 105. Table 1 shows that the standard error is reduced by a factor of approximately 40× while the mean error is reduced by over 100×, demonstrating the validity of the disclosed method.

TABLE 1

|  | without compensation | with compensation |
| --- | --- | --- |
| standard error (microgal) | 89899 | 2137 |
| mean (microgal) | 503 | 3 |

Figure 11:
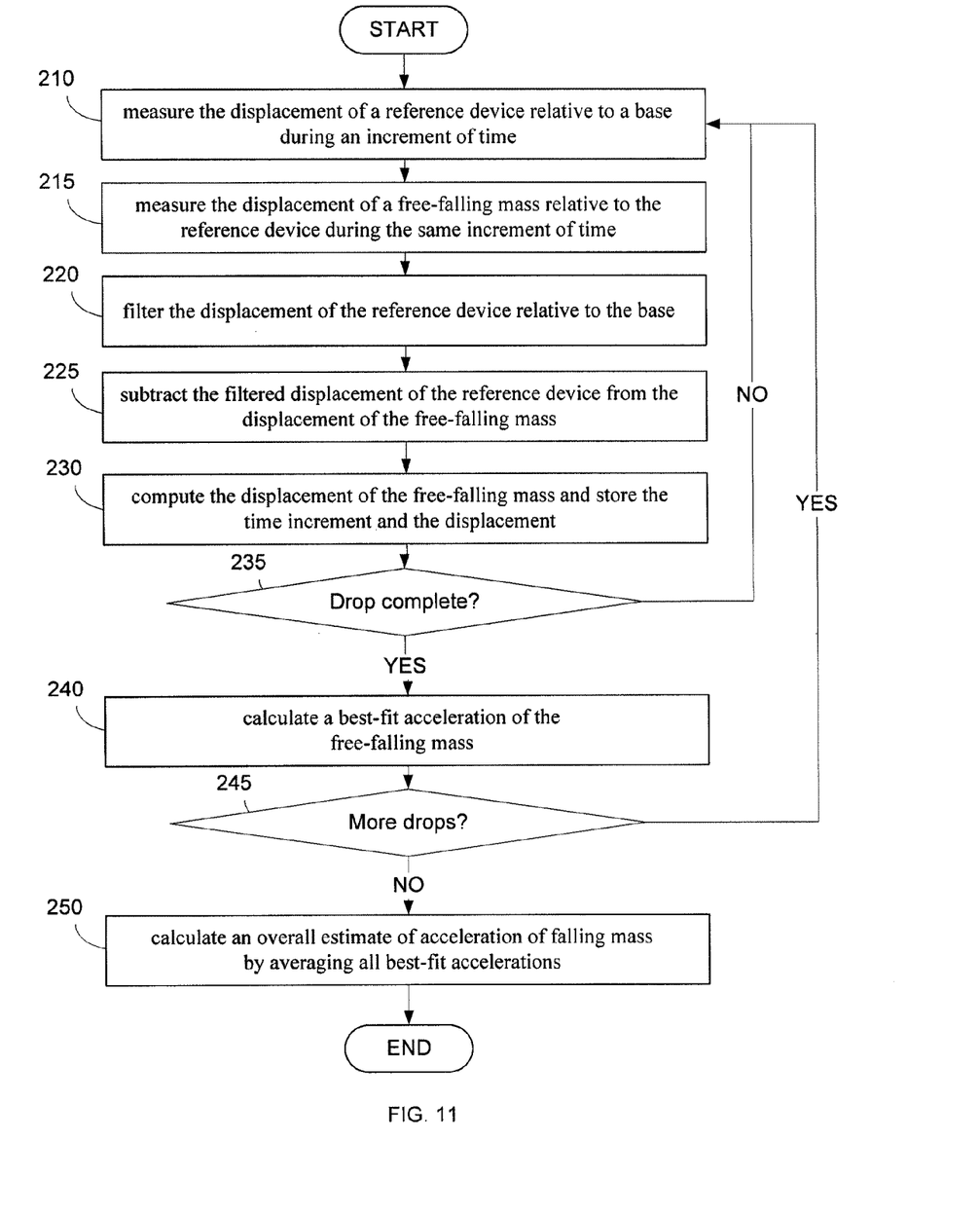
FIG. 11 is a flowchart illustrating the method of measuring the acceleration due to gravity using synthetic vibration isolation according to certain aspects of the present disclosure.

FIG. 11 is a flowchart illustrating the method of measuring the acceleration due to gravity using synthetic vibration isolation according to certain aspects of the present disclosure. The process of measuring the acceleration due to gravity will be discussed with reference to the gravimeter of FIG. 5. Most experimental measurement of the acceleration due to gravity performs hundreds of repetitions of the measurement process followed by combining the results of the entire set of measurements to reduce the error in the final value. The process starts with the repeated and uninterrupted measurement of the displacement of the reference device 42 with respect to the base 18 over regular increments of time in step 210. These measurements are filtered using a process such as depicted in FIG. 6. After sufficient time is allowed for the filter to settle, repeated drops of the freefalling mass may commence. For each drop, the displacement of the falling retroreflector 12 with respect to reference device 42 is measured in step 215 at regular increments of time coincident with the measurements of the displacement of the reference device 42 with respect to the base 18 in step 210. The measurements of the displacement of the reference device 42 with respect to the base 18 are filtered in step 220. The outputs of filter 60 which are coincident in time with the measurements of the displacement of the falling retroreflector 12 are subtracted from the measurements of the displacement of the falling retroreflector 12 in step 225 and the relative displacement of the free-falling mass in inertial space is computed and stored along with the time increment in step 230. If the drop is not finished, the processes branches at step 235 along the NO path to step 210. If the drop is complete, the process follows the YES path from step 235 to step 240. The resulting time series of corrected displacements and time increments are processed to provide a single estimate of acceleration due to gravity during the drop which is stored along with the estimates from previous drops in step 240. If there are more drops to be performed in this series of measurements, as most experiments include multiple drops of the free-falling mass up to hundreds of drops, the process branches at decision point 245 along the "YES" path to step 210. After the series of drops is complete, the process branches at decision point 245 on the "NO" path to step 250 wherein a best estimate of the acceleration of the free-falling mass is calculated from the respective estimates of all the drops. In this example, step 250 averages the estimates from each drop. In certain other embodiments, other statistical methods known to those of ordinary skill in the art may be employed to combine the estimates of acceleration due to gravity of one or more of the set of drops. This completes the example method.

It can be seen that the disclosed embodiments of a gravimeter comprising a synthetic vibration isolation provide a greatly improved accuracy in the measurement of the acceleration of a falling object under the influence of gravity compared to a similar system that uses only physical vibration isolation. The use of the synthetic vibration isolation system disclosed herein in place of the physical vibration isolation system of the current gravimeters enables the size and weight of the gravimeter to be reduced by orders of magnitude. Small gravimeters of this accuracy may be used in a variety of application where the existing instruments cannot be used, such as down-hole drilling applications.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

"Inertial space" is defined as the ideal frame of reference that is non-accelerating. In particular, an inertial reference does not have vibratory or rotational motion.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A gravimeter, comprising:
   a base;
   a reference device coupled to the base, the reference device configured to move along a first axis;
   a compliant element physically attached to the reference device and the base;
   a falling device configured to free fall from a first position on a second axis that is parallel to the first axis to a second position on the second axis;
   a measurement module coupled to the reference device, the measurement module configured to provide a first signal comprising a displacement of the reference device relative to the base and provide a second signal comprising a displacement of the falling device relative to the reference device; and
   a processing unit configured to accept the filtered first and second signals and compute a displacement of the falling device in an inertial space by processing the first and second signals and subtracting the processed first signal from the processed second signal.

2. The gravimeter of claim 1, wherein the processing unit is further configured to compute an relative acceleration of the falling device in inertial space from a plurality of the computed displacements of the falling device.

3. The gravimeter of claim 1, wherein:
   the base comprises a reflective fiducial;
   the measurement module comprises an optics module that is coupled to the reference device and a detector module that is coupled to the optics module;
   the optics module is configured to accept a beam of laser light, create a reference beam and a measurement beam, direct the measurement beam to the reflective fiducial, capture the reflected measurement beam, and provide an output comprising the reference beam and the reflected measurement beam;
   the detector module is configured to accept the output from the optics module, and compute the first signal by comparing the reflected measurement beam to the reference beam.

4. The gravimeter of claim 3, wherein the optics module further comprises an optical frequency shifter coupled to a portion of the accepted laser light beam, wherein the accepted laser light beam has a first frequency, and wherein the optical frequency shifter is configured to shift the portion of the accepted laser light beam from the first frequency to a second frequency.

5. The gravimeter of claim 4, wherein the optics module is further configured to form the measurement beam from the portion of the accepted laser light beam having the first frequency and form the reference beam from the portion of the accepted laser light beam having the second frequency.

6. The gravimeter of claim 1, wherein the processing unit is further configured to compute a displacement of the falling device in an inertial space by processing the first and second signals using a process equivalent to $\hat{X}_2(s)=Y_2(s)-Y_1(s)\cdot G(s)$ wherein:
   $\hat{X}_2(s)$ is a Laplace transform of an relative position of the falling mass in inertial space comprising the Laplace variable s;
   $Y_1(s)$ is a Laplace transform of a first distance of the reference device from the base, wherein the first distance is computed from the first signal;
   $Y_2(s)$ is a Laplace transform of a distance of the falling device from the reference device, wherein the second distance is computed from the second signal; and
   $G(s)$ is a Laplace transform of a filter function.

7. The gravimeter of claim 6, wherein:
   the compliant element has a spring rate k;
   the reference device has a mass m;
   the compliant element and the reference device form a spring-mass system having a first natural frequency $\omega_1 = \sqrt{k/m}$; and
   $G(s)$ comprises a term $$G(s) = \left( \frac{\omega_1^2}{s^2 + 2\cdot\xi_h\cdot\omega_h\cdot s + \omega_h^2} \right)$$

that comprises a filter natural frequency $\omega_h$ and a damping coefficient $\xi_h$.

8. The gravimeter of claim 7, wherein the filter natural frequency is less than the first natural frequency.

9. The gravimeter of claim 7, wherein the first natural frequency is greater than 10 Hz.

10. The gravimeter of claim 7, wherein the filter natural frequency is less than 0.5 Hz.

11. A computer-implemented method of measuring the acceleration in inertial space of a free-falling mass, the method comprising the steps of:
    measuring, using an axis, a first displacement of a reference device relative to a base during an increment of time;
    measuring, using the axis, a second displacement of a free-falling mass relative to the reference device during the same increment of time;
    filtering the first displacement;
    subtracting, with a processor, the filtered first displacement from the second displacement;
    computing, with the processor, the relative displacement of the falling mass in inertial space and storing the relative displacement and time increment;
    repeating the above steps of measuring, filtering, subtracting, and computing;
    calculating, with the processor, a best-fit estimate of the acceleration of the free-falling mass from the stored relative displacements and time increments made during a single drop;
    repeating the drop and repeating the above steps of measuring, filtering, subtracting, computing, repeating, and calculating; and
    calculating, with the processor, an overall acceleration of the mass by averaging the best-fit estimates of the acceleration from all the drops.

12. The computer-implemented method of claim 11, further comprising the step of computing, with the processor, a relative displacement position of the falling mass in inertial space using a process equivalent to $\hat{X}_2(s)=Y_2(s)-Y_1(s)\cdot G(s)$ wherein:

$\hat{X}_2(s)$ is a Laplace transform of the relative position of the falling mass in inertial space;
$Y_1(s)$ is a Laplace transform of a first distance of the reference device from the base, wherein the first distance is computed from the first signal;

Y$_2$(s) is a Laplace transform of a distance of the falling device from the reference device, wherein the second distance is computed from the second signal; and G(s) is a Laplace transform of a filter function.

13. The computer-implemented method of claim 12, wherein G(s) comprises a filter having a 40 dB/decade rolloff at frequencies above a filter natural frequency $\omega_h$.

14. The computer-implemented method of claim 13, wherein G(s) comprises:

$$G(s) = \left( \frac{\omega_1^2}{s^2 + 2 \cdot \xi_h \cdot \omega_h \cdot s + \omega_h^2} \right)$$

wherein:
- k is a spring rate of a compliant element coupled between the reference device and the base (in newtons/meter); and
- m is a mass of the reference device (in kilograms); and
- $\omega_1 = \sqrt{k/m}$ is a first natural frequency (in radians/second);
- $\omega_h$ is the filter natural frequency (in radians/second); and
- $\xi_h$ is a damping coefficient (dimensionless).

15. The computer-implemented method of claim 11, wherein the steps of measuring the first displacement comprises the steps of:
- generating a first measurement beam and a second reference beam of laser light at a first frequency, each beam having a phase;
- generating a second measurement beam and a first reference beam of laser light at a second frequency, each beam having a phase, wherein the combination of the second frequency and the first frequency creates a beat frequency;
- directing the first and second measurement beams from the reference device to a first reflective fiducial on the base and a reference reflective fiducial that is fixed with respect the origin of the beam, respectively;
- capturing the first and second reflected measurement beams that are reflected by the respective reflective fiducials;
- directing the first and second reference beams through a first and a second lightwave circuit, respectively, that are a part of the reference device;
- combining the first reflected measurement beam with the second reference beam and directing the combined beam to a first detector that generates a first signal related to the characteristics of the combined beam;
- combining the second reflected measurement beam with the first reference beam and directing the combined beam to a second detector that generates a second signal related to the characteristics of the combined beam;
- calculating, with the processor, the displacement of the reference device relative to the base by comparing the phase of the first and second signals.

16. The computer-implemented method of claim 15, wherein the step of calculating the displacement of the reference device is performed using coherent optical heterodyne interferometry.

17. A non-transitory computer-readable medium having computer-executable instructions stored thereon for execution by a processor to perform a method of measuring the relative position of a falling mass in inertial space, the method comprising the steps of:
- measuring a first displacement of a reference device relative to a base during an increment of time, wherein the base comprises a retroreflector;
- measuring a second displacement of a free-falling mass relative to the reference device during the same increment of time;
- filtering the first displacement;
- subtracting the filtered first displacement from the second displacement;
- computing the relative displacement of the falling mass in inertial space and storing the relative displacement and time increment;
- repeating the above steps of measuring, filtering, subtracting, and computing;
- calculating a best-fit estimate of the acceleration of the free-falling mass from the stored relative displacements and time increments made during a single drop;
- repeating the drop and repeating the above steps of measuring, filtering, subtracting, computing, repeating, and calculating; and
- calculating an overall acceleration of the mass by averaging the best-fit estimates of the acceleration from all the drops.

18. The non-transitory computer-readable medium of claim 17, wherein the method further comprises the step of computing an relative position of the falling mass in inertial space using a process equivalent to $\hat{X}_2(s) = Y_2(s) - Y_1(s) \cdot G(s)$ wherein:
- $\hat{X}_2(s)$ is a Laplace transform of the relative position of the falling mass in inertial space;
- Y$_1$(s) is a Laplace transform of a first distance of the reference device from the base, wherein the first distance is computed from the first signal;
- Y$_2$(s) is a Laplace transform of a distance of the falling device from the reference device, wherein the second distance is computed from the second signal; and
- G(s) is a Laplace transform of a filter function.

19. The non-transitory computer-readable medium of claim 18, wherein G(s) comprises:

$$G(s) = \left( \frac{\omega_1^2}{s^2 + 2 \cdot \xi_h \cdot \omega_h + \omega_h^2} \right)$$

wherein:
- k is a spring rate of a compliant element coupled between the reference device and the base (in newtons/meter); and
- m is a mass of the reference device (in kilograms); and
- $\omega_1 = \sqrt{k/m}$ is the first natural frequency (in radians/second);
- $\omega_h$ is a filter natural frequency (in radians/second); and
- $\xi_h$ is a damping coefficient (dimensionless).

* * * * *